(12) United States Patent
Suzuki

(10) Patent No.: US 6,738,649 B2
(45) Date of Patent: May 18, 2004

(54) PORTABLE TERMINAL EQUIPMENT AND METHOD OF CONTROLLING BACKLIGHT DISPLAY THEREIN

(75) Inventor: Masaki Suzuki, Tokyo (JP)

(73) Assignee: NEC Corporation, Tokyo (JP)

( * ) Notice: Subject to any disclaimer, the term of this patent is extended or adjusted under 35 U.S.C. 154(b) by 486 days.

(21) Appl. No.: 09/730,615

(22) Filed: Dec. 6, 2000

(65) Prior Publication Data

US 2001/0041605 A1 Nov. 15, 2001

(30) Foreign Application Priority Data

Dec. 8, 1999 (JP) .......................................... 11-348834

(51) Int. Cl.⁷ ............................ H04B 1/16; H04B 1/00; H04B 1/38
(52) U.S. Cl. .................. 455/574; 455/343.5; 340/7.32; 345/88
(58) Field of Search .............................. 455/566, 572, 455/574, 343.1, 343.5, 550.1; 340/7.32, 7.37; 345/78, 84, 88, 169, 211, 212, 214, 207, 690, 691, 867

(56) References Cited

U.S. PATENT DOCUMENTS

| | | | | |
|---|---|---|---|---|
| 5,487,181 A | * | 1/1996 | Dailey et al. | 455/90.2 |
| 6,239,787 B1 | * | 5/2001 | Sugaya | 345/169 |
| 6,269,256 B1 | * | 7/2001 | Nakamura | 455/567 |
| 6,292,676 B1 | * | 9/2001 | Ozaki et al. | 455/566 |
| 6,385,466 B1 | * | 5/2002 | Hirai et al. | 455/566 |
| 6,526,293 B1 | * | 2/2003 | Matsuo | 455/573 |

FOREIGN PATENT DOCUMENTS

| | | | |
|---|---|---|---|
| JP | 9-230304 | 9/1997 | ........... G02F/1/133 |
| JP | 10-145475 | 5/1998 | ........... H04M/1/22 |
| JP | 11-183901 | 7/1999 | |
| JP | 11-184576 | 7/1999 | |
| JP | 11-183901 | * 9/1999 | ........... H04M/1/00 |
| JP | 2000-250455 | 9/2000 | |

* cited by examiner

Primary Examiner—Edward F. Urban
Assistant Examiner—Simon Nguyen
(74) Attorney, Agent, or Firm—Scully, Scott, Murphy & Presser

(57) ABSTRACT

When the amount of remaining battery power is limited, a battery life can be extended while established function can be maintained available enough.

A battery remaining power amount monitoring portion 4 monitors the amount of remaining battery power. On lighting the backlight within a liquid crystal display 1, when a controlling portion 6 determines the amount of remaining battery power to be higher than or equal to a predetermined level based on the result of monitoring in the battery remaining power amount monitoring portion 4, the controlling portion 6 causes the width of a pulse outputted to an LED driving portion 5 to be a determined width, and when the controlling portion 6 determines the amount of remaining battery power to be lower than the predetermined level, it causes the width of a pulse outputted to the LED driving portion 5 to be a narrower width than the determined width.

9 Claims, 3 Drawing Sheets

100% (Light emission luminance 100%)

75% (Light emission luminance 100%)

50 % (Light emission luminance 50%)

25 % (Light emission luminance 25%)

0 % (Light emission luminance 0%)

PORTABLE TERMINAL EQUIPMENT AND METHOD OF CONTROLLING BACKLIGHT DISPLAY THEREIN

BACKGROUND OF THE INVENTION

1. Field of the Invention

This invention relates to portable terminal equipment, such as PHS and portable telephones, and a method of controlling backlight display therein, and, in particularly, relates to portable terminal equipment and a method of controlling backlight display therein which allows an extended operating life of a battery therein.

2. Description of the Prior Art

Conventionally, PHS and portable telephones are configured to operate using a battery as their electrical power source. When the amount of remaining power of the battery is lowered to a predetermined level, alarms or displayed massages or others notify the users that the amount of remaining battery power is limited.

When receiving the notification, the users turn the power off depending on the situation.

When alarms or displayed massages or others notify the users of the limited amount of remaining battery power in the conventional portable terminal equipment such as PHS and portable telephones described above, then the equipment has a little amount of available remaining battery time thereafter. So, it is preferable to turn the power off. Therefore, even if more conversation or a long-time standby state is necessary, the power may be sometimes set to OFF.

Thus, Japanese Patent Laid-Open No. 11-184576 discloses a technique in which, when the amount of remaining battery power is reduced, functions are stopped except for voice communications thereby allowing longer continuation of conversations or standby state.

However, according to the disclosure of the above specification, because other functions than voice communications are stopped when the amount of remaining battery power is reduced, information can not be displayed on the display device. So, there is a problem that the functions established in the terminal equipment can not be sufficiently used.

BRIEF SUMMARY OF THE INVENTION

3. Object of the Invention

In view of the problem associated with the conventional techniques as described above, this invention has been performed. An object of the invention is to provide portable terminal equipment and a method of controlling backlight display therein which permit to extend the operating life of a battery therein while the functions established in the equipment remain sufficiently available, when the amount of remaining battery power is limited.

SUMMARY OF THE INVENTION

In order to achieve the object described above, the present invention provides portable terminal equipment comprising at least;

displaying means provided with multiple-color light emitting elements used as a backlight and displaying information, a battery operating as an electrical power source, monitoring means for monitoring the amount of remaining power of the battery, driving means for driving the multiple-color light-emitting elements, and, controlling means for generating and outputting a pulse for the light-emitting elements to be driven by the driving means, wherein the controlling means, based on the result of monitoring in the monitoring means, generates and outputs a pulse for the emitting elements to be driven by the driving means.

Also, the controlling means corrects its generating pulse for the light emitting device to be driven by the driving means to a narrower pulse, when the result of monitoring in the monitoring means indicates that the amount of remaining battery power is lower than a predetermined level.

Further, the controlling means causes the driving means to drive a color light emitting element operable with lower power consumption of the multiple-color light emitting elements, when the result of monitoring in the monitoring means indicates that the amount of remaining battery power is lower than a predetermined level.

Still further, the controlling means includes a charging circuit for charging the battery with an externally supplied current.

Further, the displaying means is a liquid crystal display.

Further, a method of controlling backlight display for portable terminal equipment in which a backlight is lit by causing light-emitting elements to emit light in displaying means for displaying information comprises the steps of;

determining the width of a pulse causing said light-emitting elements to emit light, monitoring the amount of remaining power of a battery in said portable terminal equipment, when the result of said monitoring indicates that the amount of remaining power of said battery is higher than or equal to a predetermined level, causing the light-emitting elements to emit light with a pulse having said determined width, and when the result of said monitoring indicates that the amount of remaining power of said battery is lower than the predetermined level, causing the light-emitting elements to emit light with the pulse having a narrower width than said determined width.

Further, a method of controlling backlight display for portable terminal equipment in which a backlight is lit in a desired color by causing a desired light emitting element of a plurality of light emitting elements to emit light in displaying means for displaying information comprises the steps of, monitoring the amount of remaining power of a battery for said portable terminal equipment, when the result of said monitoring indicates that the amount of remaining power of said battery is higher than or equal to a predetermined level, causing said desired light emitting element to emit light, and when the result of said monitoring indicates that the amount of remaining power of said battery is lower than the predetermined level, causing a lower power light-emitting element of the plurality of light-emitting elements to emit light.

(Operation)

In the present invention configured as described above, when a backlight is to be lit, a pulse for driving light-emitting elements used as a backlight is generated in controlling means. Then, the width of a pulse to be generated is determined based on the amount of remaining power of a battery that is monitored by monitoring means. When the amount of remaining power of the battery is higher than or equal to a predetermined level, the width of a pulse to be generated is a width determined to light the backlight. On the other hand, when the amount of remaining power of the battery is lower than the predetermined level, the width of a pulse to be generated is made narrower than the width determined to light the backlight.

As a result, when the amount of remaining power of the battery is reduced to lower than a predetermined level, the quantity of current flowing through the light emitting elements is reduced, and thus their power consumption can be reduced.

DETAILED DESCRIPTION OF THE PREFERRED EMBODIMENTS

Now, the embodiments of the invention will be described with reference to the drawings.

Figure 1:
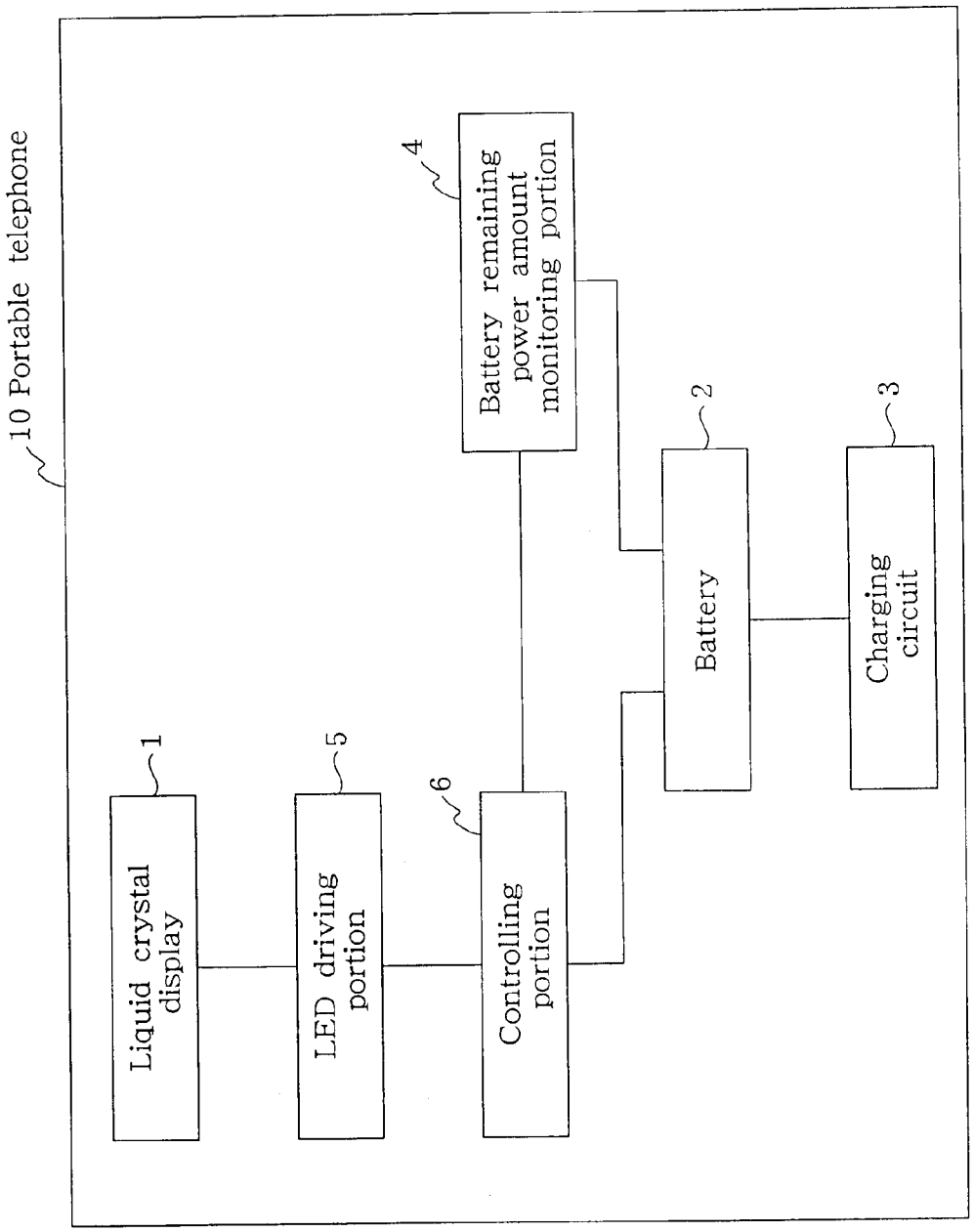
FIG. 1 shows an embodiment of the portable terminal equipment according to the invention.

FIG. 1 shows one embodiment of the portable terminal equipment according to the invention, and shows only the configurations relating to a power supply and backlight display within a portable telephone.

In the embodiment shown in FIG. 1, a portable telephone 10 comprises displaying means, here a liquid display 1, provided with multiple-color light emitting elements which are used as a backlight, here LED's, and displaying information; an electrical power source, here a battery 2; a charging circuit 3 for charging the battery 2 with a current supplied from an external power source (not shown) when the charging circuit 2 is connected thereto; monitoring means for monitoring the amount of remaining power of the battery 2, here a battery remaining-power-amount monitoring portion 4; driving means for driving the multiple-color LED's provided in the liquid display 1, here an LED-driving portion 5; and a controlling portion 6 which, based on the result of monitoring in the battery remaining-power-amount monitoring portion 4, generates and outputs a pulse for the LED's to be driven by the LED-driving portion 5.

Hereinafter, a method of controlling backlight display will be described for the liquid crystal display 1 within the portable telephone 10 configured as described above.

Figure 2:
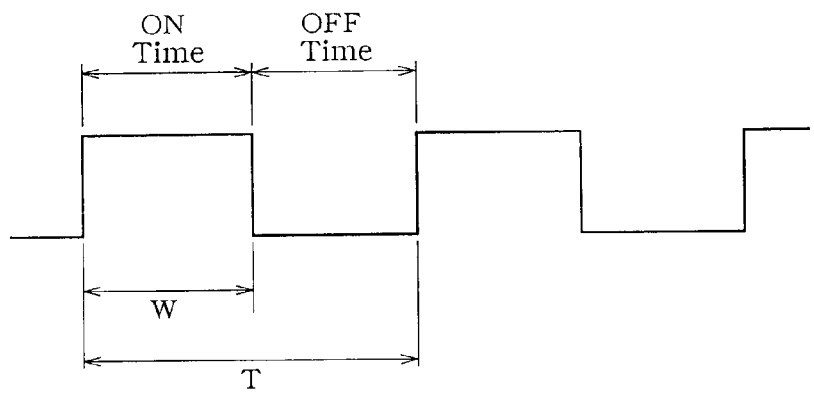
FIG. 2 shows a pulse waveform outputted from the controlling portion shown in FIG. 1.
Figure 3:
FIG. 3 shows a relation between the luminance of the backlight and the widths of the pulses outputted from the controlling portion in the liquid crystal display shown in FIG. 1.
Figure 3:
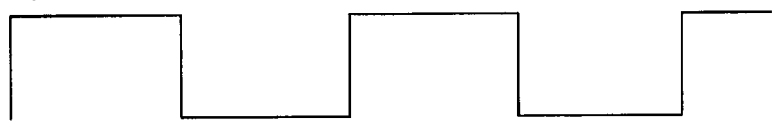
Figure 3:

FIG. 2 illustrates a pulse waveform outputted from the controlling portion 6 shown in FIG. 1, and FIG. 3 illustrates relations between the luminance of the backlight in the liquid crystal display 1 and the width of a pulse outputted from the controlling portion 6.

A pulse waveform outputted from the controlling portion 6 consists of a sequence of time periods of ON and OFF. Duty ratio is given as a ratio (W/T) of a pulse width (W) to a period (T) from the rising edge of an ON time to the rising edge of the next ON time.

In the ON time, the LED-driving portion 5 drives the LED's within the liquid crystal display 1, and thereby the backlight is lit. Also, in the OFF time, the LED-driving portion 5 does not drive the LED's within the liquid crystal display 1, and thereby the backlight is shutoff.

As shown in FIG. 3, when a pulse waveform outputted from the controlling portion 6 has a duty ratio of 100% or 75%, the luminance of the backlight is 100%. Also, when a pulse waveform outputted from the controlling portion 6 has a duty ratio of 50%, the backlight luminance is 50%. Further, when a pulse waveform outputted from the controlling portion 6 has a duty ratio of 0%, the backlight luminance is 0%. Thus, the longer the duty cycle is, the longer the light emitting time of LED is, and so the higher the luminance of the backlight.

Figure 4:
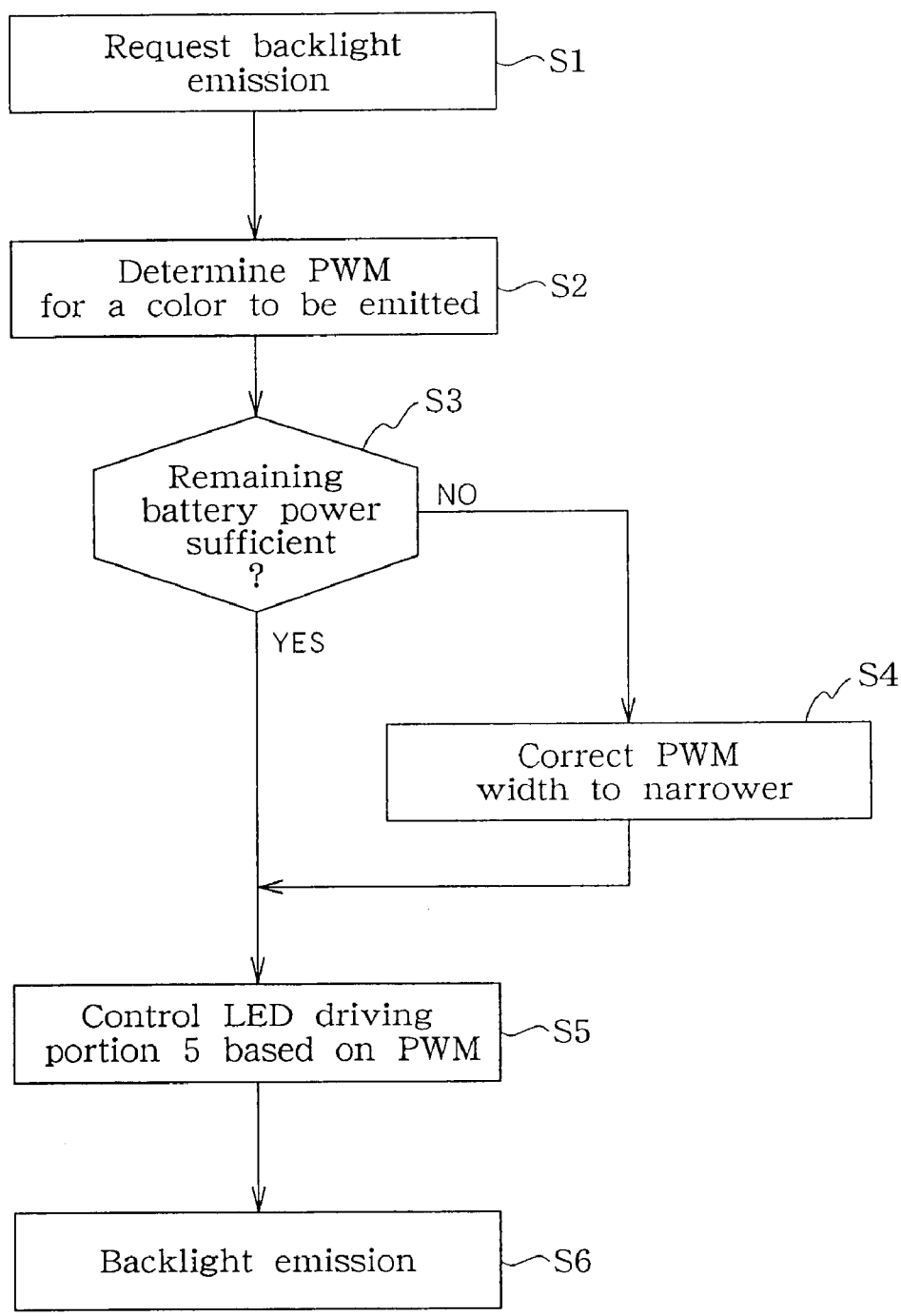
FIG. 4 shows a flowchart for illustrating a method of controlling backlight display in the liquid crystal display for the portable telephone shown in FIG. 1.

FIG. 4 shows a flowchart for illustrating a method of controlling backlight display for the liquid crystal display 1 within the portable telephone 10 shown in FIG. 1. When lighting of the backlight within the liquid crystal display 1 is required (step S1), first a PWM width for a color LED to be lit is determined (step S2). Herein, PWM (pulse width modulation) means a method for controlling the timings of ON and OFF for each of the LED's, and a PWM width for each of the LED's determines a displayed color by the backlight.

Next, the controlling portion 6 determines as to whether the amount of remaining power of the battery 2 is higher than or equal to a predetermined level, based on the result of the monitoring of the amount of remaining power of the battery 2 in a battery remaining-power-amount monitoring portion 4 (step 3).

When the amount of remaining power of the battery 2 is determined to be lower than a predetermined level in step S3, the controlling portion 6 corrects the PWM width (ON time) to a narrower width than the width determined in step S2 (step S4).

Next, when the amount of remaining power of the battery 2 is determined to be higher than or equal to a predetermined level in step S3, the controlling portion 6 controls the LED-driving portion 5 based on the PWM width determined in step S2. Further, when the amount of remaining power of the battery 2 is determined to be lower than a predetermined level in step S3, the controlling portion 6 controls the LED-driving portion 5 based on the PWM width corrected in step S4 (step 5).

Thereafter, the LED's within the liquid crystal display 1 are driven under the control of the LED-driving portion 5, and thereby the backlight is lit with a luminance depending on the PWM width determined in step S2 or the PWM width corrected in step S4.

In the present embodiment, as described above, when the result of monitoring in the battery remaining power amount monitoring portion 4 indicates that the amount of remaining power of the battery 2 is higher than or equal to a predetermined level, the controlling portion 6 uses a normal PWM width to provide a backlight display having the luminance of 100%; also, when the result of monitoring in the battery remaining power amount monitoring portion 4 indicates that the amount of remaining power of the battery 2 is lower than a predetermined level, the controlling portion 6 uses a narrower PWM width than the normal PWM width to provide a backlight display having the luminance of 25% or 50%.

As a result of this, even when the amount of remaining power of the battery 2 is limited, the present embodiment can reduce the consumption power of the backlight while maintaining the backlight in an available state, and so can extend the operating life of the battery therein.

By the way, when the amount of remaining power of the battery 2 is lower than a predetermined level, the luminance of the backlight is not limited to such as described above, but any backlight luminance is allowable as far as the operating life of the battery 2 can be extended.

(Another Embodiment)

In the embodiment described above, even when the amount of remaining battery power is limited, the controlling of the luminance of a backlight based on the amount of remaining power of the battery reduces the power consumption of the backlight while maintaining the backlight in an available state. Thus the operating life of the battery can be extended. Alternatively, even when the amount of remaining battery power is limited, automatically selecting of an emission color of LED's based on the remaining amount of a battery may be used to reduce the power consumption of a backlight while maintaining the backlight in an available state. Similarly, the operating life of the battery can be extended.

Further, when the amount of remaining battery power is reduced to lower than a predetermined level, selecting a lower power LED independently of the emission color specified by users also makes it possible to reduce the consumption power of the backlight while maintaining the backlight in an available state. Then, not only the operating life of the battery can be extended, but also it is possible to make the users know the reduction in the amount of remaining battery power.

As described above, according to the invention, the amount of remaining battery power is monitored by monitoring means, and on lighting of the backlight, if controlling means determines the amount of remaining battery power to be higher than or equal to a predetermined level on the basis of the result of monitoring in the monitoring means, the controlling means uses a determined pulse width as the pulse width driving light emitting elements used as a backlight, and when the controlling means determines the amount of remaining battery power to be lower than the predetermined level, the controlling means makes said pulse width narrower than the determined pulse width. As a result, when the amount of remaining battery power is limited, the quantity of a current flowing through the light emitting elements is reduced depending on a generated pulse, and thereby the consumption power of the backlight can be reduced while the backlight is maintained in an available state. Thus, the operating life of the battery can be extended.

Also, according to the invention, when the amount of remaining battery power is reduced to lower than a predetermined level, a color light emitting element operable with lower power consumption of multiple-color light emitting elements can be driven. Thereby, when the amount of remaining battery power is limited, the power consumption of the backlight can be reduced while the backlight is maintained in an available state, and thus not only the operating life of the battery can be extended, but also it is possible to make the users know the reduction of the amount of remaining battery power.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 11-348834 (Filed on Dec. 8, 1999) including specification, claims, drawings and summary are incorporated herein by reference in its entirety.

What is claimed is:

1. Portable terminal equipment comprising at least:

displaying means provided with multiple-color light emitting elements used as a backlight for displaying information, a battery operating as an electrical power source, monitoring means for monitoring the amount of remaining power of said battery, driving means for driving said multiple-color light emitting elements, controlling means for generating and outputting a pulse for said light emitting elements to be driven by said driving means, wherein said controlling means, based on the result of monitoring in said monitoring means, generates and outputs a pulse for said light emitting elements to be driven by said driving means, wherein, when the result of monitoring in said monitoring means indicates that the amount of remaining power of said battery is lower than a predetermined level, said controlling means causes said driving means to drive a color light emitting element operable with lower power consumption of said multiple-color light emitting elements.

2. Portable terminal equipment according to claim 1, wherein, when the result of monitoring in said monitoring means indicates that the amount of remaining power of said battery is lower than a predetermined level, said controlling means corrects to a narrower width the width of its generating pulse for said light emitting elements to be driven by said driving means.

3. Portable terminal equipment according to claim 2, including a charging circuit for charging said battery with an externally supplied current.

4. Portable terminal equipment according to claim 2, wherein said displaying means is a liquid crystal display.

5. Portable terminal equipment according to claim 1, including a charging circuit for charging said battery with an externally supplied current.

6. Portable terminal equipment according to claim 5, wherein said displaying means is a liquid crystal display.

7. Portable terminal equipment according to claim 1, wherein said displaying means is a liquid crystal display.

8. A method of controlling backlight display in portable terminal equipment, in which a backlight is lit by causing light emitting elements to emit light in displaying means for displaying information, said method comprising the steps of:

determining the width of a pulse for causing said light emitting elements to emit light;

monitoring the amount of remaining power of a battery for said portable terminal equipment;

when the result of said monitoring indicates that the amount of remaining electric power of said battery is higher than or equal to a predetermined level, causing said light emitting elements to emit light with a pulse having said determined width; and when the result of said monitoring indicates that the amount of remaining power of said battery is lower than the predetermined level, causing said light emitting elements to emit light with a pulse having a narrower width than said determined width.

9. A method of controlling backlight display in portable terminal equipment in which a backlight is lit in a desired color by causing a desired light emitting element of a plurality of light emitting elements to emit light in displaying means for displaying information, said method comprising the steps of, monitoring the amount of remaining power of a battery for said portable terminal equipment;

when the result of said monitoring indicates that the amount of remaining power of said battery is higher than or equal to a predetermined level, causing said desired light emitting element to emit light; and when the result of said monitoring indicates that the amount of remaining electric power of said battery is lower than a predetermined level, causing a light emitting element operable with lower power consumption of said light emitting elements to emit light.

* * * * *